June 22, 1965  D. C. REILLY ETAL  3,190,602
CLAMPING DEVICE
Filed Aug. 12, 1963
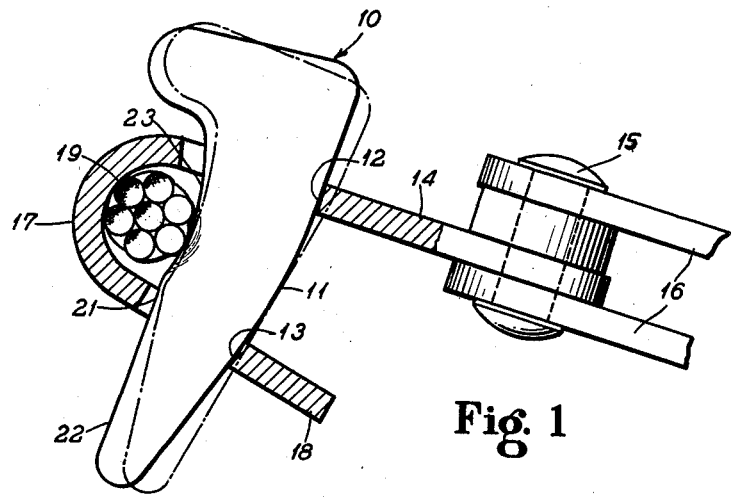
Fig. 1
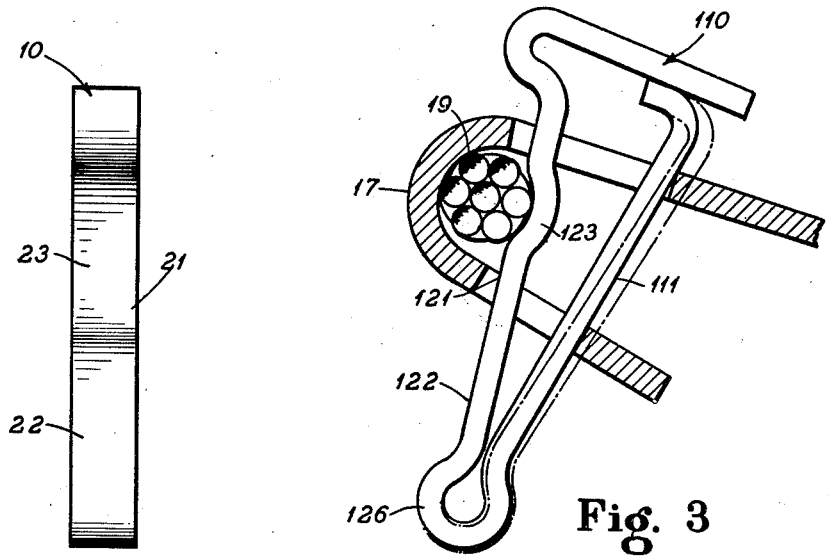
Fig. 2
Fig. 3
INVENTOR.
Donald C. Reilly
BY  Wayne R. Stuetzer
Herman E. Smith
ATTORNEY

United States Patent Office 3,190,602
Patented June 22, 1965

3,190,602
CLAMPING DEVICE
Donald C. Reilly, Downers Grove, and Wayne R. Stuetzer, Chicago, Ill., assignors to Goodman Manufacturing Company, Chicago, Ill., a corporation of Illinois
Filed Aug. 12, 1963, Ser. No. 301,339
1 Claim. (Cl. 248—230)

The present invention relates generally to clamping apparatus and more particularly to apparatus for securing an object to an elongated structural member.

A variety of belt conveyor currently in widespread use has roller assemblies hung from longitudinal stringer members such as ropes, tubes or rods. In such conveyors it is desirable to attach various components, including roller assemblies, to the stringer member by apparatus which prevents longitudinal shifting along the stringer member.

Accordingly, it is an object of the present invention to provide releasable, reusable locking apparatus capable of gripping a stringer member to locate an object at a preselected position therealong.

Other objects and advantages of the invention will become apparent from the following description together with the drawing.

In the drawing:

FIGURE 1 is a view, partly in section, of a preferred embodiment of the present invention, showing a clamp assembly;

FIGURE 2 is an end view of the resilient pin of FIGURE 1; and

FIGURE 3 is a view, similar to FIGURE 1, showing an alternate form of the invention.

Referring now more particularly to the drawing, the numeral 10 refers to a locking pin preferably made of an elastomeric material such as synthetic rubber. The full line profile shows the pin deformed to provide tightly gripping engagement with the assembly, while the broken line shows the undeformed profile. Locking pin 10 has a rear surface 11 which frictionally engages the walls 12 and 13 of a hanger 14. Hanger 14 is connected to a link 16 by a pin 15. Objects such as a conveyor roller may be connected to link 16. Hanger 14 is bent to form a bight or saddle portion 17 and a short leg 18 in which the wall 13 is located. The bight or saddle portion 17 conforms generally to the outline of a longitudinal stringer member 19 which may be a rope, tube or rod and is shown herein as a wire rope.

Locking pin 10 has a front surface 21 which has a camming portion 22 beginning near the lower end thereof. Camming portion 22 and rear surface 11 provide a tapered or wedge-like entrant profile for the lower end of pin 10. The front surface 21 is relieved above the camming portion 22 to provide a pocket portion 23. Pocket portion 23 bears upon stringer member 19 to press it tightly into engagement with saddle 17. Pin 10, being made of a resilient elastomeric material, is capable of undergoing considerable flexure and deformation to permit tight engagement with stringer 19 and walls 12 and 13. These same properties make it possible to readily remove pin 10 from hanger 14 without rupturing the pin or permanently changing its profile. A further advantage of the resilient pin is that it can be repeatedly installed and removed without scarring or abrading the stringer member. Where the stringer is a wire rope, it is very desirable to protect the outer wires from fraying as a result of scuffing and abrasion.

The alternate form of the invention shown in FIGURE 3 of the drawing has a locking pin 110 made of a continuous strip of material, such as steel possessing spring-like properties. Pin 110 has a rear surface 111 and a front surface 121. Front surface 121 has a tapered, entrant camming portion 122 terminating in a pocket portion 123. The bend 126 joining front and rear surfaces 121 and 111 provides a resilient connection between the said surfaces. When pin 110 is inserted into a hanger, the camming portion 122, bearing on the stringer member, forces front and rear surfaces 121 and 111 toward each other until the pocket portion is reached, after which the front and rear surfaces spring apart to secure the stringer member in the hanger saddle while simultaneously maintaining the pin in place.

While we have shown and described a preferred embodiment of our invention, it is to be understood that other forms can be practiced within the spirit of the invention and the scope of the following claim.

We claim:

In clamping apparatus including a hanger having a surface adapted to embrace a stringer member, the improvement in means for securing said hanger surface in tight frictional engagement with said stringer comprising: an elongated pin of resilient elastomeric material having front and rear faces diverging from each other at different angles along the length thereof to define a first narrow, tapered flexible portion at one end thereof, succeeded by a wider pocket portion provided with a locally deformable high friction zone along a mid portion thereof, succeeded in turn by a still wider third head portion at the opposite end thereof.

References Cited by the Examiner
UNITED STATES PATENTS

| 1,757,462 | 5/30 | Mack | 85—8.3 |
| 2,092,401 | 9/37 | Miller | 24—126 |
| 2,495,848 | 1/50 | Kiesel | 24—81 |
| 2,866,249 | 12/58 | Nomandin | 24—263 |
| 2,922,208 | 1/60 | Arndt | 24—126 |

CLAUDE A. LE ROY, *Primary Examiner.*